United States Patent
Li

(10) Patent No.: US 8,290,002 B2
(45) Date of Patent: Oct. 16, 2012

(54) COARSE TIMING SYNCHRONIZATION ACQUISITION METHOD IN A MOBILE COMMUNICATION SYSTEM

(75) Inventor: Qiang Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 377 days.

(21) Appl. No.: 12/679,016

(22) PCT Filed: Dec. 29, 2007

(86) PCT No.: PCT/CN2007/003944
§ 371 (c)(1),
(2), (4) Date: Mar. 19, 2010

(87) PCT Pub. No.: WO2009/055987
PCT Pub. Date: May 7, 2009

(65) Prior Publication Data
US 2010/0226360 A1    Sep. 9, 2010

(30) Foreign Application Priority Data

Oct. 31, 2007    (CN) .......................... 2007 1 0124223

(51) Int. Cl.
*H04J 3/06*    (2006.01)
(52) U.S. Cl. ...................................................... 370/509
(58) Field of Classification Search .................. None
See application file for complete search history.

(56) References Cited

U.S. PATENT DOCUMENTS

| | | | | |
|---|---|---|---|---|
| 6,023,477 A | * | 2/2000 | Dent ............................. | 370/509 |
| 6,470,030 B1 | * | 10/2002 | Park et al. ..................... | 370/480 |
| 7,020,074 B1 | | 3/2006 | Rickard et al. | |
| 7,062,282 B2 | * | 6/2006 | Liu et al. ....................... | 455/502 |
| 2004/0120307 A1 | | 6/2004 | Takahashi | |
| 2006/0018413 A1 | * | 1/2006 | Gupta ........................... | 375/343 |

FOREIGN PATENT DOCUMENTS

| | | |
|---|---|---|
| CN | 1494809 A | 5/2004 |
| CN | 1523795 A | 8/2004 |
| WO | 03084080 A2 | 10/2003 |

OTHER PUBLICATIONS

English Translation of the Written Opinion of the International Search Authority in international application No. PCT/CN2007/003944, mailed on Jul. 31, 2008.
International Search Report in international application No. PCT/CN2007/003944, mailed Jul. 31,2008.

* cited by examiner

*Primary Examiner* — Raj Jain
(74) *Attorney, Agent, or Firm* — Oppedahl Patent Law Firm LLC

(57) ABSTRACT

A coarse timing synchronization acquisition method in a mobile communication system is applied to the timing synchronization acquisition of a mobile communication system that transmits the same signal blocks repeatedly, which comprises: starting from the beginning time instant of timing synchronization acquisition, iteratively calculating the delay correlation accumulation (DCA) values at K samples, when K is the number of DCA values at each time slot; M time slots are searched in each frame, the position corresponding to the maximum DCA value is taken as the estimate of timing synchronization position; M timing synchronization position estimates are obtained, and among these, one timing synchronization position estimate is selected as the candidate for the current frame timing synchronization position, and it is decided whether the candidate is reliable; after L frames are searched, a predicted timing synchronization position of the next frame is obtained by using the L timing synchronization positions.

20 Claims, 1 Drawing Sheet

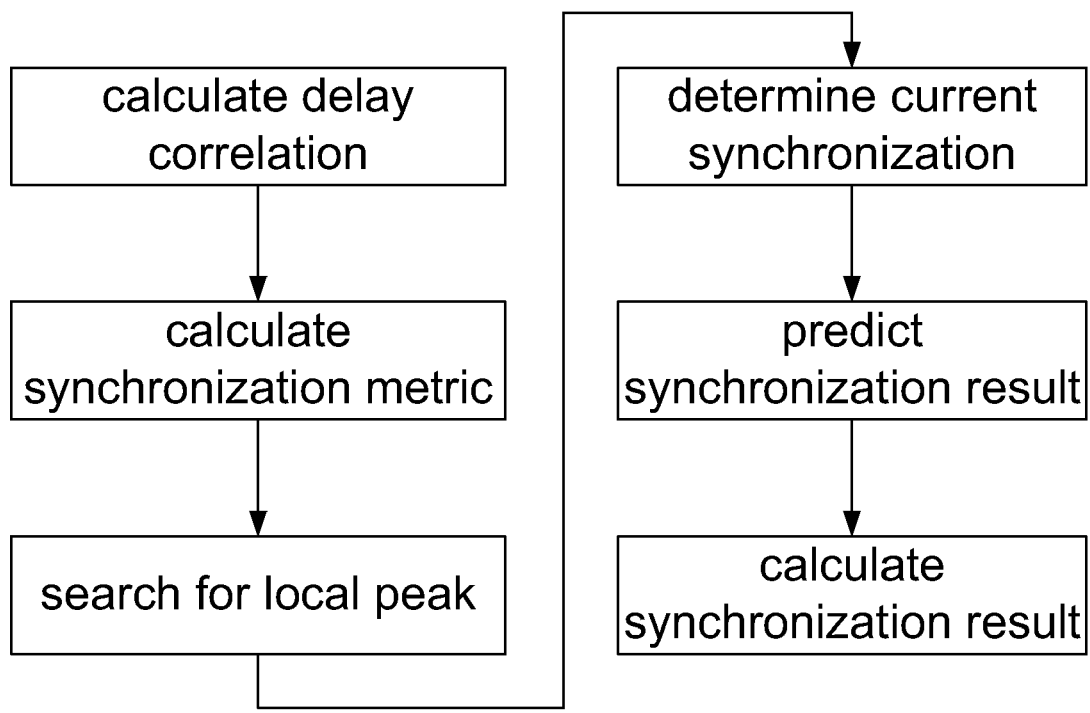

COARSE TIMING SYNCHRONIZATION ACQUISITION METHOD IN A MOBILE COMMUNICATION SYSTEM

TECHNICAL FIELD

The present invention relates to the field of mobile communications, especially to a coarse timing synchronization acquisition method in a mobile communication system.

BACKGROUND

In order to provide high-speed multimedia transmission services, it is necessary in a broadband wireless access system to adopt advanced techniques which counteract the frequency-selective fading effects of wireless channels. Many researchers have appreciated the use of Orthogonal Frequency Division Multiplexing (OFDM), which is well known as an excellent approach for alleviating the detrimental effects of frequency selective fading, and which is a preferred physical transmission technique employed in various wireless standards, and is to be standardized and industrialized.

Mobile multimedia broadcast is an important application of the OFDM technique. An OFDM transmission system requires both frequency synchronization and timing synchronization. Timing synchronization further comprises coarse timing synchronization and fine timing synchronization. The coarse timing synchronization searches in received signals to acquire the timing of the transmission of an OFDM signal, and so as to determine the start time instant of an OFDM symbol. OFDM systems are vulnerable to timing errors as they can introduce inter-subcarrier interference by destroying the orthogonality between subcarriers, and finally lead to the performance degradation at the receiver. Existing coarse timing synchronization methods not only require the receiver to make use of a high-precision crystal oscillator but also impose a heavy computational burden on the timing synchronization module.

SUMMARY

The present invention aims to solve the above-mentioned technical shortcomings by providing a coarse timing synchronization acquisition method in a mobile communication system, applied in a mobile communication system that transmits the same signal block repeatedly, especially in a mobile multimedia broadcast system, with simple, effective and robust implementation in practical operation. The method provides a synchronization prediction function that can be used for predicting a sample-level timing offset that can be resulted in by an inaccurate sampling clock. The method permits the receiver to employ a low-precision crystal oscillator. In addition, the technical scheme provided by the present invention is flexible; it can be broadly applied in various systems that implement timing synchronization by transmitting the same signal block repeatedly. The predicted result provides frequency offset information as well, part of which can be put to use in correcting estimates of frequency offset.

To solve the above-mentioned problems, the present invention provides a coarse timing synchronization acquisition method in a mobile communication system, which is applied for timing synchronization acquisition of a mobile communication system that transmits the same signal block repeatedly. The method comprises the following processing steps:

A, from the beginning time instant of synchronization acquisition, iteratively calculating the delay correlation accumulation (DCA) values of K samples, where K is the number of DCA values at each time slot;

B, M time slots are searched in each frame, in each time slot, a maximum DAC value defines a timing synchronization position estimate, M timing synchronization position estimates are obtained in each frame, and among these, one timing synchronization position estimate is selected as the candidate for the timing synchronization position of current frame, and it is decided whether the candidate is reliable;

C, after L frames are searched, a predicted value of timing synchronization position in the next frame is obtained by using the L previous timing synchronization positions; when reliable timing synchronization positions consecutively approach the predicted values of timing synchronization position of the frame, the timing synchronization position of the last frame outputs as acquired timing synchronization position of current frame.

Further, in said step C:

reliable timing synchronization positions consecutively approaching the predicted value of synchronization position of the frame may mean:

the timing synchronization positions of $L_{acq}$ consecutive frames are reliable, and the difference between the timing synchronization positions and the predicted timing synchronization position of the current frame is less than or equal to $T_{acq}$; where $L_{acq}$ is the minimum number of consecutive reliable frames of timing synchronization acquisition; and where $T_{acq}$ is the threshold for timing synchronization acquisition decision;

determining the timing synchronization position of last frame to be the acquired timing synchronization position of current frame may mean:

the acquired timing synchronization position is the timing synchronization position of the last frame of the $L_{acq}$ consecutive frames.

Further, this method may be applied in mobile multimedia broadcast systems.

Further, said step A may further comprise: computing the synchronization metric of DCA values;

in said step B, the position that corresponds to the maximum DCA value may be the position at which the synchronization metric is the local peak in the time slot.

Further, said synchronization metric may be a power P of the DCA value.

Further, said step B may further comprise: outputting a reliability indicator of timing synchronization position of current frame; the reliability indicator being used to signify whether the timing synchronization position of the current frame is reliable;

in said step C, all timing synchronization position of $L_{acq}$ consecutive frames may being reliable means: reliability indicators of all the $L_{acq}$ consecutive frames show that timing synchronization positions of these frames are reliable.

Further, in said step B, a timing synchronization position and a reliability indicator may be obtained according to the following formula:

the timing synchronization position of current frame is:

$$U = \operatorname*{argmax}_{k}\{P_{V_k}\}, \text{ where, } k = 0, 1, \ldots, M-1,$$

Vk is an estimate of timing synchronization position in a time slot, namely, U is an estimate of timing synchronization position corresponding to the maximum peak among the M local peaks.

A reliability indicator of timing synchronization position of the current frame is:

$$f = \begin{cases} 1, & P_U \geq T_{dec} \\ 0, & P_U < T_{dec}, \end{cases}$$

where $T_{dec}$ is the threshold for timing synchronization reliability decision.

Further, in said step B, a timing synchronization position and a reliability indicator may be obtained according to the following formula:

a timing synchronization position of current frame is:

$$U = V_{[M/2]};$$

a reliability indicator of a timing synchronization position of current frame is:

$$f = \begin{cases} 1, & \max(V_{k+1} - V_k) \leq T_{dec} \\ 0, & \max(V_{k+1} - V_k) > T_{dec} \end{cases}, \forall k,$$

where, local peak positions are normalized; $T_{dec}$ is the threshold for timing synchronization reliability decision, V is a timing synchronization position estimate, and max(•) is a "maximum" operand.

Further, in said step B, a correlation envelope detection algorithm or maximum correlation value detection algorithm may be adopted to search for a local peak of each frame and the timing synchronization position estimate corresponding to the local peak.

Further, in step A, calculating the DCA value may mean:
calculating the initial value of DCA first:

$$\theta_0 = \sum_{k=0}^{N-1} r(k+k_0) r^*(k+k_0+N_D),$$

where, r(k) is a digital baseband received signal, N is a length of DCA, $N_D$ is a number of delayed samples of delay correlation, $k_0$ is a beginning time instant of timing synchronization acquisition, and r*(•) denotes a complex conjugate operation;

based on the initial value of DCA, starting from the beginning time instant of timing synchronization acquisition, a DCA value at each sample is computed iteratively:

$$\theta_i = \theta_{i-1} + r(k_0+i+N-1)r^*(k_0+i+N_D+N-1) - r(k_0+i-1)r^*(k_0+i+N_D-1),$$

where, i=1, 2, 3, ... K.

Further, in said step A, DCA value may be calculated according to the following formula:

$$\theta_i = \sum_{k=0}^{N-1} r(k+k_0+i) r^*(k+k_0+i+N_D),$$

where, r(k) is a digital baseband received signal, N is a length of DCA, $N_D$ is a number of delayed samples of delay correlation, $k_0$ is a beginning time instant of timing synchronization acquisition, and r*(•) denotes a complex conjugate operation; i=1, 2, 3, ... K.

Further, in said step C, a predicted value of timing synchronization position of the next frame being obtained by using the L timing synchronization positions may mean:

adopting a robust least-square linear fitting algorithm to predict the timing synchronization position of the (L+1)th frame, by utilizing said L timing synchronization positions.

Compared with existing techniques, the method of the present invention is characterized by the flexible design of timing acquisitions, by a less demanding computation for a timing synchronization search, high accuracy of synchronization acquisition results, good robustness of a receiver system. The method completely avoids complex modulo or division operations that would be required in computation in an existing technique, and can be conveniently carried out in either hardware or software.

BRIEF DESCRIPTION OF THE DRAWINGS

FIG. 1 is a flowchart illustrating a coarse timing synchronization acquisition method according to the present invention.

DETAILED DESCRIPTION

The technical scheme of the present invention will be illustrated in further details with reference to the drawing and embodiments hereinafter.

A core idea of the present invention is to search for correlation peaks within a certain time range by utilizing identical signal blocks at each time slot of physical frames and adopting a delay correlation method, so as to acquire the estimate of the receiver's coarse timing synchronization. In order to make the coarse synchronization result more robust and reliable, a timing synchronization result at a current time slot is predicted, which can greatly decrease the probability of the appearance of abnormal values in coarse timing synchronization results, and which can increase the accuracy of the receiver's timing acquisition.

Main technical characteristics of the present invention are as follows: (1) a delay correlation technique is adopted; (2) a related accumulation value carries frequency offset information; (3) a simplified method of power computation is adopted; (4) search results are stable and reliable; (5) a synchronization prediction technique is adopted; (6) a receiver can work even if it has a crystal oscillator of low precision. Combining the above-mentioned characteristics, the present invention, when it uses a low-precision crystal oscillator, can acquire the coarse timing synchronization of the mobile communication system transmitting the same signal block repeatedly with low complexity in real time, so that the requirement of timing synchronization raised by this type of mobile communication systems is well satisfied.

In order to make the technical scheme and technical advantages of the present invention clearer, a terminal receiver of a China Mobile Multimedia Broadcasting system will be discussed, thus illustrating in detail a technical scheme of the coarse timing synchronization acquisition provided by the present invention, with reference to FIG. 1. The present invention is not limited to this embodiment, and can also be applied for timing synchronization acquisition of other mobile communication systems in which a same signal block is transmitted repeatedly.

Exemplary values of main design parameters related to the present embodiment are as shown in Table 1.

TABLE 1

Main design parameter list of the embodiment

| Design Parameter | Parameter Value | Meaning of parameter |
|---|---|---|
| $N_D$ | 2048 | delayed sample points of delay correlation |
| N | 2048 | length of delay correlation accumulation |
| K | 250000 | number of delay correlation accumulation values at each time slot |
| M | 3 | number of time slots searched in each frame |
| $T_{dec}$ | 32 | decision threshold of synchronization reliability |
| L | 8 | number of history records of timing synchronization positions |
| $T_{acq}$ | 32 | decision threshold of synchronization acquisition |
| $L_{acq}$ | 1 | the minimum number of consecutive reliable frames of timing synchronization acquisition |

In practical application, the parameters are not limited to the above-mentioned values, which can be chosen based on actual situations.

A, calculating a timing synchronization metric

Step A comprises the following steps specifically:

A1, calculating a DCA value starting from the beginning time instant of timing synchronization acquisition, iteratively computing the DCA values at each sample.

In order to reduce the converging time of timing synchronization search, an initial value of delay correlation accumulation can be computed first:

$$\theta_0 = \sum_{k=0}^{N-1} r(k+k_0) r^*(k+k_0+N_D),$$

where, r(k) is a digital baseband received signal, N is a length of DCA, $N_D$ is a number of delayed samples of delay correlation, $k_0$ is a beginning time instant of timing synchronization acquisition, and $r^*(\cdot)$ denotes a complex conjugate operation.

Based on the initial DCA value, starting from the beginning time instant of timing synchronization acquisition, a DCA value at each sample is computed iteratively:

$$\theta_i = \theta_{i-1} + r(k_0+i+N-1)r^*(k_0+i+N_D+N-1) - r(k_0+i-1)r^*(k_0+i+N_D-1),$$

where, i=1, 2, 3, ... K, and K is a number of DCA values at each time slot.

Of course, in order to reduce storage space needed for the computation, the directly related formula below can also be employed:

$$\theta_i = \sum_{k=0}^{N-1} r(k+k_0+i) r^*(k+k_0+i+N_D).$$

To be noted, a disadvantage of a direct computing method is the relatively large amount of computation.

A2, calculating a timing synchronization metric

A DCA value is a complex number and, for the convenience of searching for timing synchronization, it is needed to construct a timing synchronization metric, which is a function of a DCA value.

In the present embodiment, powers of the DCA values are taken as the timing synchronization metric, the power is:

$$P_i = \theta_i \theta_i^*.$$

The following simplified formula can also be adopted in order to reduce computational burden:

$$P_i = \alpha \max(|real(\theta_i)|, |imag(\theta_i)|) + \beta \min(|real(\theta_i)|, |imag(\theta_i)|),$$

where, $\alpha+1, \beta+\frac{1}{2}$ in this embodiment, real(•) is the real part of the complex number while imag(•) is the imaginary part thereof, and max(•) and min(•) are the maximum and minimum of their respective operands, respectively.

In a practical application, it is not required that the power be employed as timing synchronization metric.

B, updating synchronization data

Step B comprises the following steps specifically:

B1, searching for a local peak

M time slots are searched in each frame of timing synchronization, and M timing synchronization position estimates can be obtained. When the normal timing synchronization position is searched, said DCA value appears to be the maximum one, and said timing synchronization metric value is the peak point, namely the maximum or the minimum value. In this embodiment, a local peak is the power in step A2, and the position corresponding to the local peak of this power serves as the estimate of timing synchronization position. Supposing that there is one timing synchronization position among every K samples, a local peak searching unit needs to find one timing synchronization position estimate within the range of every K sample points according to the power.

The present invention supports but is not limited to any one of the two algorithms of searching for local peak, where one is a correlation envelope detection algorithm, and the other one is a maximum correlation value detection algorithm.

If the second detection algorithm is adopted, the result of a timing synchronization position estimate corresponding to the local peak of local peak searching is:

$$V_k = \arg\max_{kK \leq i < (k+1)K} \{P_i\}, \text{ where, } k = 0, 1, \ldots, M-1.$$

It is assumed that the local peaks searched within 10 consecutive frames in step B1 are as shown in Table 2.

TABLE 2

Partial peak list

| | Time slot 1 | | | Time slot 2 | | | Time slot 3 | | |
|---|---|---|---|---|---|---|---|---|---|
| Frame num. | Peak | correlation value | Position | Peak | correlation value | Position | Peak | correlation value | Position |
| 0 | 1.77e7 | −13 + j75 | 12258 | 1.71e7 | −13 + j69 | 12247 | 1.78e7 | −13 + j82 | 12264 |
| 1 | 1.66e7 | −13 + j62 | 12488 | 1.55e7 | −12 + j66 | 12450 | 1.87e7 | −15 + j66 | 12421 |

TABLE 2-continued

| | Partial peak list | | | | | | | | |
|---|---|---|---|---|---|---|---|---|---|
| | Time slot 1 | | | Time slot 2 | | | Time slot 3 | | |
| Frame num. | Peak | correlation value | Position | Peak | correlation value | Position | Peak | correlation value | Position |
| 2 | 1.84e7 | −15 + j64 | 12655 | 1.86e7 | −13 + j10 | 12628 | 1.74e7 | −14 + j64 | 12647 |
| 3 | 1.98e7 | −16 + j74 | 12838 | 1.80e7 | −13 + j86 | 12852 | 1.69e7 | −13 + j61 | 12844 |
| 4 | 1.89e7 | −15 + j76 | 13048 | 1.84e7 | −14 + j86 | 13030 | 1.92e7 | −15 + j78 | 13047 |
| 5 | 1.85e7 | −14 + j84 | 113410 | 2.03e7 | −14 + j10 | 13233 | 1.87e7 | −15 + j67 | 113433 |
| 6 | 1.93e7 | −15 + j66 | 13433 | 1.88e7 | −14 + j87 | 13488 | 1.77e7 | −13 + j84 | 13404 |
| 7 | 1.85e7 | −14 + j75 | 13628 | 1.88e7 | −14 + j86 | 13615 | 1.80e7 | −14 + j74 | 13632 |
| 8 | 1.87e7 | −15 + j68 | 13857 | 1.75e7 | −14 + j56 | 13815 | 1.93e7 | −14 + j88 | 13834 |
| 9 | 1.83e7 | −13 + j92 | 14051 | 1.98e7 | −16 + j70 | 14033 | 1.74e7 | −13 + j83 | 14052 |

B2, determining current timing synchronization

In each frame, a local peak searching unit obtains a plurality of timing synchronization position estimates, selects the most reliable one from the multiple synchronization position estimates as the timing synchronization position U of current frame, decides whether the position U is reliable at the same time, and can be but is not limited to calculating the reliability indicator f of the current timing synchronization position, wherein this reliability indicator is used to indicate whether the timing synchronization position of the current frame is reliable. A reliability indicator of "1" means the timing synchronization position is reliable, while a reliability indicator of "0" means the timing synchronization position is not reliable. The most reliable estimate value can be selected according to the actual situation, such as selecting the one at a middle position. If only one time slot is searched in a frame, selection is unneeded. The present invention supports but is not limited to two decision algorithms, one being a peak-based detection algorithm, and the other one being a peak position-based determining algorithm.

a, peak-based detection algorithm

A timing synchronization position of current frame is $$U = \operatorname*{argmax}_{k}\{P_{V_k}\}, \text{ where, } k = 0, 1, \ldots, M-1,$$

U is a timing synchronization position $V_k$ of maximum peak among M local peaks, and $P_{V_k}$ is the power corresponding to position $V_k$.

A reliability indicator of a timing synchronization position of the current frame is $$f = \begin{cases} 1, & P_U \geq T_{dec} \\ 0, & P_U < T_{dec}, \end{cases}$$

where, $P_U$ is the power corresponding to position U.

b, peak position-based determining algorithm

Supposing that timing synchronization position estimates $V_k$ corresponding to local peaks of several time slots in current frame are sorted in ascending order, the timing synchronization position of the current frame is $$U = V_{\lfloor M/2 \rfloor},$$

where, $\lfloor M/2 \rfloor$ is the largest integer not greater than M/2.

A reliability indicator of a timing synchronization position of the current frame is $$f = \begin{cases} 1, & \max(V_{k+1} - V_k) \leq T_{dec} \\ 0, & \max(V_{k+1} - V_k) > T_{dec}, \end{cases} \forall k.$$

(Note: local peaks need to be normalized hereby.)

A peak position-based determining algorithm as in b is adopted in the present embodiment. According to the partial peak list shown in Table 2, timing synchronization position and reliability indicator are calculated, and results of 10 consecutive frames are shown in Table 3.

TABLE 3

| Frame synchronization determining list | | |
|---|---|---|
| Frame num. | Frame synchronization position U | Reliability indicator f |
| 0 | 12258 | 1 |
| 1 | 12450 | 0 |
| 2 | 12647 | 1 |
| 3 | 12844 | 1 |
| 4 | 13047 | 1 |
| 5 | 113410 | 0 |
| 6 | 13433 | 0 |
| 7 | 13628 | 1 |
| 8 | 13834 | 1 |
| 9 | 14051 | 1 |

C, acquiring synchronization results

Step C comprises the following steps specifically as follows:

C1, predicting synchronization results

After L frames are searched, L timing synchronization positions are obtained. A timing synchronization position of current frame is the timing synchronization position U corresponding to frame synchronization positions obtained in step B2. A timing synchronization predicting unit will, by making use of these L timing synchronization positions, predict the timing synchronization position $p_L$ of the (L+1)th frame. Supposing that the L timing synchronization positions are respectively $s_0, s_1, \ldots, s_{L-1}$, a fitting curve can be obtained by using robustness least-square linear fitting algorithm, that is:

$$p_i = ax_i + b,$$

where, $x_i = i$, $i = 0, 1, \ldots$. Then the predicted value of timing synchronization position of the (L+1)th frame is:

$$p_L = aL + b.$$

In accordance with the above-mentioned prediction algorithm, and according to the synchronization positions from frame 0 to frame 7 shown in Table 3, a fitting curve can be obtained as follows:

$$p_i = 196.1i + 12260,$$

then the predicted value of a synchronization position of frame 8 is:

$$p_L p_8 = 196.1 \times 8 + 12260 = 13829.$$

According to the synchronization positions from frame 1 to frame 8 shown in Table 3, another fitting curve can be obtained as follows:

$$p_i = 197i + 12250.$$

Then the predicted value of a synchronization position of frame 9 is:

$$p_{L+1} = p_9 = 197 \times 9 + 12250 = 14023.$$

In practical applications, one is not limited to a least-square linear fitting algorithm to obtain a fitting curve; indeed any linear fitting algorithm that can eliminate abnormal values can be adopted for this purpose.

C2, calculating the synchronization results when there are consecutive reliable timing synchronization positions close to the predicted values of timing synchronization positions of current frame, it is determined that the acquired timing synchronization position is the timing synchronization position of the last frame.

Specifically, when several frames are searched, a predicted value sequence of timing synchronization position $s_L$, $s_{L+1}, \ldots$, a reliable indicator sequence $f_L, f_{L+1}, \ldots$, and a timing synchronization prediction sequence $p_L, p_{L+1} \ldots$ are obtained, when $L_{acq}$ consecutive frames satisfy these conditions:

$$|s_{L+q} - p_{L+q}| \leq T_{acq},$$

and $$f_{L+q} = 1, \text{ where}, q = 0, 1 \ldots, L_{acq} - 1,$$

it is considered that a reliable timing synchronization position is acquired, and the outputting acquired timing synchronization position is that of the last frame: $s_{L+q}$. Otherwise, the synchronization acquisition process will be continued.

Of course, it is not required to output the reliability indicator in practical applications, and when $L_{acq}$ consecutive frames satisfy the following condition:

$$|s_{L+q} - p_{L+q}| \leq T_{acq},$$

and timing synchronization position of the $L_{acq}$ consecutive frames are reliable, the outputting acquired timing synchronization position is that of the last frame of the $L_{acq}$ consecutive frames: $s_{L+q}$.

According to the above method, synchronization acquisition conditions in the present embodiment and data in the above tables, are calculated as:

$$|s_L - p_L| = |s_8 - p_8| = 5 \leq T_{acq} = 32, \text{ and } f_8 = 1;$$

$$|s_{L+1} - p_{L+1}| = |s_9 - p_9| = 28 \leq T_{acq} = 32, \text{ and } f_9 = 1;$$

then it holds that the receiver has acquired the timing synchronization position, which is $s_{L+1} = 14051$.

The above discussion, with reference to specific preferable embodiments, is a further illustration of the present invention. The invention should not be construed, however, as limited to the embodiments illustrated above. It should be understood by those skilled in the field that, without departing from the spirit of the present invention, any simple deduction or substitute is deemed to be included within the scope of the present invention, as defined by the claims.

Industrial Applicability

The present invention can, under the condition that low-precision crystal oscillator is adopted, take full use of structural characteristics of physical frames of the mobile communication system transmitting the same signal block repeatedly, and can acquire coarse timing synchronization of such mobile communication systems fast, in real time and with low complexity of calculation, so as to satisfy well the requirements of timing synchronization raised by such mobile communication systems.

What is claimed is:

1. A coarse timing synchronization acquisition method in a mobile communication system, the synchronization acquisition method practiced with respect to a beginning time instant; the method comprising the following processing steps:
   A, starting from the beginning time instant of timing synchronization acquisition, iteratively calculating delay correlation accumulation (DCA) values at K samples, where K is a number of delay correlation accumulation values at each time slot;
   B, searching M time slots in each frame, in each time slot, a maximum DCA value defining a timing synchronization position estimate, M synchronization position estimates being obtained in each frame, and among these, one timing synchronization position estimate being selected as the candidate for the timing synchronization position of current frame, and deciding whether the candidate is reliable;
   C, after L frames are searched, deriving a predicted value of a timing synchronization position of a next frame from the L previous timing synchronization positions; when reliable timing synchronization positions consecutively approach the predicted values of the timing synchronization position of the next frame, taking the timing synchronization position of the last frame as an acquired timing synchronization position.

2. The method according to claim 1, wherein, in said step C:
   reliable timing synchronization positions consecutively approaching the predicted value of the timing synchronization position of the next frame comprises: timing synchronization positions of $L_{acq}$ consecutive frames being reliable, and the difference between timing synchronization positions and the predicted value of the timing synchronization position of the next frame being less than or equal to $T_{acq}$; where, said $L_{acq}$ is the minimum number of consecutive frames of reliable timing synchronization positions, said $T_{acq}$ is the threshold for timing synchronization acquisition decision;
   taking the timing synchronization position of the last frame as an acquired timing synchronization position comprises: the acquired timing synchronization position being the timing synchronization position of the last frame of the $L_{acq}$ consecutive frames.

3. The method according to claim 2, wherein, in said step C, a predicted value of timing synchronization position of the next frame being obtained by using L timing synchronization positions comprises:
   adopting a robust least-square linear fitting algorithm to predict the timing synchronization position of the (L+1)th frame, by utilizing said L timing synchronization positions.

4. The method according to claim 1 further characterized in that the method is applied in a mobile multimedia broadcast system.

5. The method according to claim 1, wherein,
   said step A further comprises: computing a timing synchronization metric of delay correlation accumulation values;
   in said step B: the position that corresponds to the maximum DCA value is defined as a position at which timing synchronization metric reaches the local peak in a time slot.

6. The method according to claim 5, wherein, said timing synchronization metric is a power P of the DCA values.

7. The method according to claim 6, wherein, in said step A, calculating the DCA value comprises:
calculating the initial value of DCA:

$$\theta_0 = \sum_{k=0}^{N-1} r(k+k_0)r^*(k+k_0+N_D),$$

where, r(k) is a digital baseband received signal, N is a length of DCA, $N_D$ is a number of delayed samples of delay correlation, $k_0$ is a beginning time instant of timing synchronization acquisition, and r*(•) denotes a complex conjugate operation;

based on the initial value of DCA, starting from the beginning time instant of timing synchronization acquisition, a DCA value at each sample being computed iteratively:

$$\theta_i = \theta_{i-1} + r(k_0+i+N-1)r^*(k_0+i+N_D+N-1) - r(k_0+i-1)r^*(k_0+i+N_D-1),$$

where, i=1, 2, 3, ... K.

8. The method according to claim 5, wherein,
said step B further comprises: outputting a reliability indicator of timing synchronization position of current frame; said reliability indicator being used to signify whether timing synchronization position of current frame is reliable;

in said step C, all timing synchronization position of $L_{acq}$ consecutive frames being reliable comprises: reliability indicator of all the $L_{acq}$ consecutive frames showing that timing synchronization positions of current frames are reliable.

9. The method according to claim 8, wherein, in said step B, timing synchronization position and reliability indicator are obtained according to the following formula:
timing synchronization position of current frame being:

$$U = \underset{k}{\mathrm{argmax}}\{P_{V_k}\}, \text{ where, } k = 0, 1, \ldots, M-1,$$

Vk is an estimated timing synchronization position in a time slot, namely, U is an estimate of timing synchronization position corresponding to the maximum peak among M local peaks;

a reliability indicator of timing synchronization position of current frame being $$f = \begin{cases} 1, & P_U \geq T_{dec} \\ 0, & P_U < T_{dec}, \end{cases}$$

where, $T_{dec}$ is the threshold for timing synchronization reliability decision.

10. The method according to claim 9, wherein, in said step A, calculating the DCA value comprises:
calculating the initial value of DCA:

$$\theta_0 = \sum_{k=0}^{N-1} r(k+k_0)r^*(k+k_0+N_D),$$

where, r(k) is a digital baseband received signal, N is a length of DCA, $N_D$ is a number of delayed samples of delay correlation, $k_0$ is a beginning time instant of timing synchronization acquisition, and r*(•) denotes a complex conjugate operation;

based on the initial value of DCA, starting from the beginning time instant of timing synchronization acquisition, a DCA value at each sample being computed iteratively:

$$\theta_i = \theta_{i-1} + r(k_0+i+N-1)r^*(k_0+i+N_D+N-1) - r(k_0+i-1)r^*(k_0+i+N_D-1),$$

where, i=1, 2, 3, ... K.

11. The method according to claim 9, wherein, in said step C, a predicted value of timing synchronization position of the next frame being obtained by using L timing synchronization positions comprises:
adopting a robust least-square linear fitting algorithm to predict the timing synchronization position of the (L+1)th frame, by utilizing said L timing synchronization positions.

12. The method according to claim 8, wherein, in said step B, timing synchronization position and reliability indicator are obtained according to the following formula:
a timing synchronization position of a current frame being:

$$U = V_{[M/2]};$$

a reliability indicator of timing synchronization position of current frame being:

$$f = \begin{cases} 1, & \max(V_{k+1} - V_k) \leq T_{dec} \\ 0, & \max(V_{k+1} - V_k) > T_{dec} \end{cases}, \forall k;$$

wherein, local peak positions are normalized; $T_{dec}$ is the threshold for timing synchronization reliability decision, V is a timing synchronization position estimate, and max(•) is a "maximum" operand.

13. The method according to claim 12, wherein, in said step C, a predicted value of timing synchronization position of the next frame being obtained by using L timing synchronization positions comprises:
adopting a robust least-square linear fitting algorithm to predict the timing synchronization position of the (L+1)th frame, by utilizing said L timing synchronization positions.

14. The method according to claim 8, wherein, in said step A, calculating the DCA value comprises:
calculating the initial value of DCA:

$$\theta_0 = \sum_{k=0}^{N-1} r(k+k_0)r^*(k+k_0+N_D),$$

where, r(k) is a digital baseband received signal, N is a length of DCA, $N_D$ is a number of delayed samples of delay correlation, $k_0$ is a beginning time instant of timing synchronization acquisition, and r*(•) denotes a complex conjugate operation;

based on the initial value of DCA, starting from the beginning time instant of timing synchronization acquisition, a DCA value at each sample being computed iteratively:

$$\theta_i = \theta_{i-1} + r(k_0+i+N-1)r^*(k_0+i+N_D+N-1) - r(k_0+i-1)r^*(k_0+i+N_D-1),$$

where, i=1, 2, 3, ... K.

15. The method according to claim 8, wherein, in said step C, a predicted value of timing synchronization position of the next frame being obtained by using L timing synchronization positions comprises:
adopting a robust least-square linear fitting algorithm to predict the timing synchronization position of the (L+1)th frame, by utilizing said L timing synchronization positions.

16. The method according to claim 5, wherein,
a correlation envelope detection algorithm or maximum correlation value detection algorithm is adopted in said step B to search for a local peak of each frame and the corresponding timing synchronization position estimate.

17. The method according to claim 16, wherein, in said step A, calculating the DCA value comprises:
calculating the initial value of DCA:

$$\theta_0 = \sum_{k=0}^{N-1} r(k+k_0) r^*(k+k_0+N_D),$$

where, r(k) is a digital baseband received signal, N is a length of DCA, $N_D$ is a number of delayed samples of delay correlation, $k_0$ is a beginning time instant of timing synchronization acquisition, and r*(•) denotes a complex conjugate operation;
based on the initial value of DCA, starting from the beginning time instant of timing synchronization acquisition, a DCA value at each sample being computed iteratively:

$$\theta_i = \theta_{i-1} + r(k_0+i+N-1) r^*(k_0+i+N_D+N-1) - r(k_0+i-1) r^*(k_0+i+N_D-1),$$

where, i=1, 2, 3, ... K.

18. The method according to claim 5, wherein, in said step A, calculating the DCA value comprises:
calculating the initial value of DCA:

$$\theta_0 = \sum_{k=0}^{N-1} r(k+k_0) r^*(k+k_0+N_D),$$

where, r(k) is a digital baseband received signal, N is a length of DCA, $N_D$ is a number of delayed samples of delay correlation, $k_0$ is a beginning time instant of timing synchronization acquisition, and r*(•) denotes a complex conjugate operation;
based on the initial value of DCA, starting from the beginning time instant of timing synchronization acquisition, a DCA value at each sample being computed iteratively:

$$\theta_i = \theta_{i-1} + r(k_0+i+N-1) r^*(k_0+i+N_D+N-1) - r(k_0+i-1) r^*(k_0+i+N_D-1),$$

where, i=1, 2, 3, ... K.

19. The method according to claim 1, wherein, in said step A, calculating the DCA value comprises:
calculating the initial value of DCA:

$$\theta_0 = \sum_{k=0}^{N-1} r(k+k_0) r^*(k+k_0+N_D),$$

where, r(k) is a digital baseband received signal, N is a length of DCA, $N_D$ is a number of delayed samples of delay correlation, $k_0$ is a beginning time instant of timing synchronization acquisition, and r*(•) denotes a complex conjugate operation;
based on the initial value of DCA, starting from the beginning time instant of timing synchronization acquisition, a DCA value at each sample being computed iteratively:

$$\theta_i = \theta_{i-1} + r(k_0+i+N-1) r^*(k_0+i+N_D+N-1) - r(k_0+i-1) r^*(k_0+i+N_D-1),$$

where, i=1, 2, 3, ... K.

20. The method according to claim 1, wherein, in said step C, a predicted value of timing synchronization position of the next frame being obtained by using L timing synchronization positions comprises:
adopting a robust least-square linear fitting algorithm to predict the timing synchronization position of the (L+1)th frame, by utilizing said L timing synchronization positions.

* * * * *